United States Patent
Orosa et al.

(10) Patent No.: US 6,277,423 B1
(45) Date of Patent: *Aug. 21, 2001

(54) FRIED SNACK, FRIED SNACK DOUGH AND PROCESS FOR MAKING THE SAME

(75) Inventors: Mario Escobar Orosa, Fairfield; David Arthur Lanner, Cincinnati; Yen-Ping Chin Hsieh, Cincinnati; David Shang-Jie Chang, Cincinnati, all of OH (US)

(73) Assignee: The Procter & Gamble Co., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/642,896

(22) Filed: Aug. 21, 2000

Related U.S. Application Data

(60) Division of application No. 09/448,137, filed on Nov. 24, 1999, now Pat. No. 6,136,359, which is a continuation-in-part of application No. 08/964,533, filed on Nov. 5, 1997, now Pat. No. 6,033,707, which is a continuation-in-part of application No. 08/943,459, filed on Oct. 3, 1997, now Pat. No. 6,022,574, which is a continuation of application No. 08/586,047, filed on Jan. 16, 1996, now abandoned.

(51) Int. Cl.⁷ .................................................. A23L 1/21
(52) U.S. Cl. .................. 426/445; 426/440; 426/443; 426/446; 426/496; 426/516; 426/549; 426/559; 426/656; 426/658; 426/661; 426/808
(58) Field of Search .................... 426/549, 560, 426/559, 656, 658, 661, 440, 443, 446, 496, 516, 808, 445

(56) References Cited

U.S. PATENT DOCUMENTS

| | | | |
|---|---|---|---|
| 3,989,858 | 11/1976 | Williams | 426/552 |
| 4,560,569 | 12/1985 | Ivers | 426/549 |
| 4,623,548 | 11/1986 | Willard | 426/559 |
| 4,623,550 | 11/1986 | Willard | 426/559 |
| 4,668,519 | 5/1987 | Dartley et al. | 426/548 |
| 4,678,672 | 7/1987 | Dartey et al. | 426/19 |
| 4,756,920 | 7/1988 | Willard | 426/549 |
| 4,769,253 | 9/1988 | Willard | 426/559 |
| 4,770,891 | 9/1988 | Willard | 426/559 |
| 4,806,377 | 2/1989 | Ellis et al. | 426/549 |
| 4,834,996 | 5/1989 | Fazzolare et al. | 426/302 |
| 4,873,093 | 10/1989 | Fazzolare et al. | 426/28 |
| 4,965,081 | 10/1990 | Lazarus | 426/242 |
| 4,973,481 | 11/1990 | Hunt et al. | 426/144 |
| 4,994,295 | 2/1991 | Holm et al. | 426/549 |
| 5,030,468 | 7/1991 | Van Lengerich et al. | 426/549 |
| 5,093,146 | 3/1992 | Calandro et al. | 426/619 |
| 5,104,673 | 4/1992 | Fazzolare et al. | 426/549 |
| 5,120,554 | 6/1992 | Farnsworth et al. | 426/282 |
| 5,320,858 | 6/1994 | Fazzolare et al. | 426/549 |
| 5,340,598 | 8/1994 | Hay, Jr. et al. | 426/496 |
| 5,405,625 | 4/1995 | Biggs | 426/93 |
| 5,429,834 | 7/1995 | Addesso et al. | 426/549 |
| 5,458,910 | 10/1995 | Gruetzmacher et al. | 426/611 |
| 5,464,642 | 11/1995 | Villagran et al. | 426/439 |
| 5,500,240 | 3/1996 | Addesso et al. | 426/560 |
| 5,514,387 | 5/1996 | Zimmerman et al. | 426/74 |
| 5,514,404 | 5/1996 | Zimmerman et al. | 426/549 |
| 5,554,405 | 9/1996 | Fazzolare et al. | 426/560 |
| 5,652,010 | 7/1997 | Gimmler et al. | 426/549 |
| 5,690,982 | 11/1997 | Fazzolare et al. | 426/550 |
| 5,904,947 | 5/1999 | Jensen et al. | 426/560 |
| 5,922,386 | 7/1999 | Reed et al. | 426/549 |
| 5,925,396 | 7/1999 | Reed et al. | 426/549 |
| 5,928,700 | 7/1999 | Zimmerman et al. | 426/549 |
| 5,928,701 | 7/1999 | Jensen et al. | 426/560 |
| 6,001,409 | 12/1999 | Gimmler et al. | 426/549 |
| 6,022,574 | 2/2000 | Lanner et al. | 426/445 |
| 6,033,707 | 3/2000 | Lanner et al. | 426/445 |
| 6,136,359 | * 10/2000 | Orosa et al. | 426/445 |

FOREIGN PATENT DOCUMENTS

| | | | |
|---|---|---|---|
| 0 096 305 | 12/1983 | (EP) | A23L/1/164 |
| 0 287 158 | 10/1988 | (EP) | A23L/1/164 |
| 0 387 606 A2 | 9/1990 | (EP) | A23L/1/217 |
| 1142460 | 1/1968 | (GB) | . |
| 2111816 | 7/1983 | (GB) | A23L/1/10 |
| 94/23591 | 10/1994 | (WO) | A23L/1/217 |
| 95/05090 | 2/1995 | (WO) | A23L/1/217 |
| 97/25880 | 7/1997 | (WO) | A23L/1/164 |
| 9951111 | 10/1999 | (WO) | A23L/1/164 |

* cited by examiner

*Primary Examiner*—Arthur L. Corbin
(74) *Attorney, Agent, or Firm*—Melody A. Jones

(57) ABSTRACT

Disclosed is a fried snack, a fried snack dough, and a process for preparing the same. The snack is prepared from a dough comprising starch-based flour, pregelled modified starch, and added water. The dough is extruded to form a snack piece, then fried to form a snack with a light, crispy, crunchy texture.

12 Claims, No Drawings

FRIED SNACK, FRIED SNACK DOUGH AND PROCESS FOR MAKING THE SAME

CROSS REFERENCE TO RELATED APPLICATIONS

This application is a divisional of U.S. application Ser. No. 09/448,137, filed Nov. 24, 1999, now U.S. Pat. No. 6,136,259, which is a continuation-in-part of U.S. application Ser. No. 08/964,533, filed Nov. 5, 1997, now U.S. Pat. No. 6,033,707, which is a continuation-in-part of U.S. application Ser. No. 08/943,459, filed Oct. 3, 1997, now U.S. Pat. No. 6,022,574, which is a continuation of U.S. application Ser. No. 08/586,047, filed Jan. 16, 1996, now abandoned.

TECHNICAL FIELD

This application relates to a fried snack, a fried snack dough, and a process for preparing the same.

BACKGROUND OF THE INVENTION

A wide variety of farinacious (starch and protein-based) snacks are presently available to consumers. Many of these snacks are in the form of chips, strips, or extruded tubular pieces. Some of these snacks are expanded or puffed and contain a cellular or honeycombed internal structure. Many of these conventional snacks have random or non-uniform shapes.

Consumers consider a number of factors when evaluating the desirability of a snack. In addition to taste and texture, visual appeal is an important consideration. Many consumers find snacks shaped into a design such as an animal, bird, or face, to be visually appealing and distinctive. This enhances their enjoyment of the snack. Accordingly, it would be desirable to provide consumers with a snack that can be produced in a variety of eye-pleasing three- dimensional shapes. In particular, it would be desirable to provide consumers with a fried, extruded, three-dimensional snack having adjacent dough planes that articulate a design when the snack is viewed in cross-section.

Many problems are encountered when trying to make such a snack. The shape of the die and the size of the planes can present problems with shaping the dough as it emerges from the extruder. Furthermore, the dough shape must stay intact and not distort as the dough is fried. The finished snack must be strong enough to resist breakage, yet not too hard or brittle. The finished snack must also be crispy, crunchy, and thin.

It is therefore an object of the present invention to provide a fried, extruded snack that can be produced in a variety of shapes, especially shapes where adjacent dough planes articulate a design when the snack is viewed in cross-section. It is also an object to provide a dough and a method for making the fried snack.

SUMMARY OF THE INVENTION

The present invention relates to a fried, extruded snack that can be produced in a variety of shapes, including shapes where adjacent dough planes articulate a design when the snack is viewed in cross-section. The finished snack is crispy, crunchy, and thin, yet not too hard or brittle. The process of preparing the snack comprises the steps of:

(a) extruding a dough comprising:
(1) from about 35% to about 60% starch based flour containing from about 6% to about 15% protein, wherein the ratio of gelatinized to ungelatinized starch in the starch based flour is from about 15 to 85 to about 65 to 35;
(2) from about 2% to about 25% pregelled modified starch; and
(3) from about 25% to about 55% added water;

said extrusion being at a pressure of from about 500 psig ($3.45 \times 10^6$ Pa) to about 1500 psig ($10.34 \times 10^6$ Pa) and a temperature of from about 70° F. (21.1° C.) to about 150° F. (65.6° C.);

(b) extruding the dough through a shaped orifice of from about 0.02 to about 0.05 inches (0.05 to 0.13 cm) to form a snack piece which is cut to at least 0.12 inches (0.3 cm) thick; and (c) frying said snack piece.

The snack pieces are fried at a temperature sufficient to form snacks having a light, crispy, crunchy texture, improved flavor, and a fat content of from about 20% to about 40%. The water content of the fried snack is less than about 3%.

These and other features and aspects of the present invention will become better understood with reference to the following description and appended claims.

DESCRIPTION OF THE INVENTION

A. Definitions

As used herein, all percentages and proportions are "by weight" unless otherwise specified.

As used herein, "added water" refers to water which has been added to the dry dough ingredients. Water which is inherently present in the dry dough ingredients, such as in the case of the sources of flour and starches, is not included in "added water". (The level of water in flours and starches is usually from about 3% to about 12%.) The amount of added water includes any water used to dissolve or disperse ingredients, as well as water present in corn syrups or hydrolyzed starches.

As used herein, "fat," "shortening," and "oil" are used interchangeably unless otherwise specified. The terms "fat," "shortening," and "oil" refer to edible fatty substances in a general sense, including natural or synthetic fats and oils consisting essentially of triglycerides, such as, for example, soybean oil, corn oil, cottonseed oil, sunflower oil, palm oil, coconut oil, canola oil, fish oil, lard, and tallow, which may have been partially or completely hydrogenated or modified otherwise, as well as non-toxic fatty materials having properties similar to triglycerides, herein referred to as non-digestible fats, which materials may be partially or fully indigestible, reduced calorie fats such as those made with long chain and medium or short chain fatty acids, and mixtures thereof.

B. Dough

A particularly important aspect of the present invention is the dough. The dough comprises: (1) starch based flour having both gelatinized and ungelatinized starch, (2) pregelled modified starch, and (3) added water. This dough can be processed in an extruder to provide a shaped dough piece which remains intact when fried to form thin, crispy, shaped snack products with a light, crunchy texture.

1. Flour

An important component of the dough is a starch based flour. The dough comprises from about 35% to about 60% of a starch based flour which contains from about 6% to about 15% protein. The ratio of gelatinized to ungelatinized starch in the starch-based flour is from about 15 to 85 to about 65 to 35. Tuber and grain flours, such as corn, potato, tapioca, peanut, wheat, oat, rice, and soy meal can be used. Suitable potato flours include dehydrated potato flakes and granules, mashed potato materials, and dried potato products. Corn flour is the most preferred source of starch based flour. Suitable sources of corn flour include corn masa and ground corn. Preferred masas include white corn masa and yellow corn masa. These starch based flours can be blended to make snacks of different composition and flavor. The flours inherently contain starch, but other starches can also be added. Suitable starches include potato starch, tapioca starch, corn starch, oat starch, rice starch, and wheat starch.

The flour should have a ratio of gelatinized to ungelatinized starch of from about 15 to 85 to about 65 to 35. While not intending to be limited by theory, it is believed that pregelatinized starch helps to bind the dough once hydrated, enabling formation of the shape during extrusion, and provides a cohesive structure in which the leavening and steam can uniformly expand during frying to yield both optimal texture and visual definition of shape.

The protein level of the flour should be about 6% to about 15%. Preferably, a corn masa is used to provide the protein. In a preferred dough, from about 35% to about 60% corn masa is used, from about 2% to about 10% corn flour or corn meal, and from about 2% to about 25% pregelatinized modified starch.

2. Emulsifier

A particularly important aspect of the present invention is the inclusion of emulsifier in the dough. Emulsifier helps maintain the integrity of the dough's starch structure and rheology throughout the extrusion process.

The dough comprises from about 0.1% to about 3% emulsifier, preferably from about 0.1% to about 1.3%, and more preferably from about 0.5% to about 0.9%. Preferred emulsifiers include polyglycerol monoesters, mono and diglycerides of fatty acids, diacetyl tartaric acid esters of monoglycerides (DATEM), and mixtures thereof. The most preferred emulsifier is DATEM.

Diacetyl Tartaric Acid Esters of Monoglycerides (DATEM)

DATEM is a fatty acid ester of glycerine which is esterified with diacetyl tartaric acid and a fatty acid having from about 12 to about 22 carbon atoms. The fatty acid may be saturated or unsaturated. Preferably, the Iodine Value of the DATEM is from about 0 to about 110, more preferably from about 50 to 110, and most preferably from about 70 to about 85. As used herein, "DATEM" can include esters of monoglycerides as well as diglycerides, in addition to mixtures thereof. Preferred brands of DATEM include Panodan SDK™ and Panodan 205 K™ (both available from Danisco Cultor of New Century, Kans.).

Polyglycerol Esters

Polyglycerol esters of lower molecular weight may be used herein. These are predominantly polyglycerols which are diglycerol or triglycerol entities. When glycerine is polymerized, a mixture of polyglycerols are formed. Most preferred for use in this invention is a diglycerol monoester which is a mixture of monoesters of polyglycerol which is predominantly a diglycerol. The preferred fatty acids used to made the esters are saturated and unsaturated fatty acids having from about 12 to about 22 carbon atoms. The most preferred diglycerol monoester is diglycerol monopalmitate.

Mono and Diglycerides of Fatty Acids

Mono and diglycerides of saturated and unsaturated fatty acids having from about 12 to about 22 carbon atoms can also be used herein.

3. Added Water

The dough of the present invention comprises from about 25% to about 55% added water, and more preferably, from about 30% to about 40% added water. This low level of water in the dough, along with the emulsifier, provides a dough which can form cohesive shapes.

As used herein, the term "added water" refers to water which has been added to the dry dough ingredients. Water which is inherently present in the dry dough ingredients, such as in the case of the sources of flour and starches, is not included in the added water. (The level of water in flours and starches is usually from about 3% to about 12%.) The amount of added water includes any water used to dissolve or disperse ingredients, as well as water present in corn syrups, hyrolyzed starches, etc. For instance, if maltodextrin or corn syrup solids are added as a solution or syrup, the water in this syrup or solution must be accounted for as "added water".

4. Leavening

The dough also contains from about 0.2% to about 5% leavening. Any conventional leavening can be used. Highly preferred leavenings include alkali metal carbonates and hydrogen carbonates, e.g. sodium bicarbonate, sodium or potassium carbonate, and calcium carbonate. Other leavening agents, such as sodium aluminum phosphate, can be used but are not as preferred.

Preferably, the leavening should be of a larger particle size or encapsulated to prevent it from evolving gas in the extruder and thus expanding the product before frying. Preferably a particle size of from about 0.0035 inches (0.09 mm) to about 0.0098 inches (0.25 mm) is used. The leavening can also be encapsulated in a low melting fat or shortening so that it is released at the fry temperatures.

5. Modified Starch

Modified starch can be added to the dough. Modified starches suitable for use herein include any suitable food starch which has been modified by at least partial hydrolysis and/or chemical modification. Suitable modified starches can be derived from starches such as corn, potato, tapioca, and rice by processes including acetylation, chlorination, acid hydrolysis, enzymatic action, oxidation, or the introduction of carboxyl, sulfate, or sulfonate groups.

Pregelled Modified Starch

The dough comprises from about 2% to about 25%, preferably from about 10% to about 20%, pregelled modified starch. This starch helps to develop the dough strength, provides a firm definition to the dough, and helps to control the expansion of the dough during frying. A preferred pregelled modified starch is modified waxy corn starch. Especially preferred are Baka Plus™ and Instant Cleargel™ (both available from National Starch of Bridgewater, N.J.).

Hydrolyzed Starch

The dough of the present invention can comprise from about 0.5% to about 15%, preferably from about 2% to about 10%, hydrolyzed starch. The term "hydrolyzed starch" refers to oligosaccharide-type materials that are typically obtained by acid and/or enzymatic hydrolysis of starches, preferably corn starch. Suitable hydrolyzed starches for inclusion in the dough include maltodextrins and corn syrup solids. The hydrolyzed starches preferably have Dextrose Equivalent (DE) values of from about 10 to about 36 DE, preferably from about 10 to about 30 DE, and more preferably about 10 to about 20 DE. The DE value is a measure of the reducing equivalence of the hydrolyzed starch referenced to dextrose and expressed as a percentage (on a dry basis). The higher the DE value, the more reducing sugars are present. Maltrin™ 050, M100, M150, M180, M200, and M250 (available from Grain Processing Corporation of Muscatine, Iowa) are preferred maltodextrins.

6. Shortening

The dough may optionally contain from about 0.1% to about 5%, preferably from about 0.1% to about 3%, shortening. According to the present invention, however, a desirable snack can be produced without the use of shortening. Preferably, the shortening contains from about 80% to 95% of a liquid oil and from about 5% to about 20% of a solid fat. The preferred sources of the oil and fat are vegetable oils such as partially hydrogenated canola oil, corn oil, soybean oil, or cottonseed oil. Animal fats or marine oils may also be used. The preferred shortenings are beta prime shortenings.

Both nondigestible and digestible fats can be used. Nondigestible fats, such as polyol polyesters, and reduced calorie fats, such as those made with long chain and medium or short chain fatty acids, can also be used. See, for example, U.S. Pat. No. 4,005,195 and U.S. Pat. No. 4,005,196 issued to Jandacek et al.; U.S. Pat. No. 4,832,975 issued to Yang; U.S. Pat. No. 4,582,715 issued to Volpenhein; U.S. Pat. No. 5,419,925 issued to Seiden et al.; U.S. Pat. No. 5,288,512 issued to Seiden; U.S. Pat. No. 5,422,131 issued to Elsen et al.; and U.S. Pat. No. 4,861,613 issued to White, all of which are herein incorporated by reference.

7. pH

Preferably, the pH of the dough is between about 5 and about 8. This helps to control the release of the leavening and improves the flavor and texture.

8. Other Ingredients

Salt, flavorings, seasonings, or mixtures thereof can also be included in the dough or sprinkled on the surface of the snack after frying. For example, sucrose can be added at a level of from about 1% to about 5% in the dough, more preferably from about 1% to about 3%.

Vitamins and minerals can also be added to improve the nutritional value of the extruded snack. These vitamins and minerals can be added to the dough or topically applied after frying.

C. Extrusion

Snack pieces can be formed in an extruder. A single or twin screw extruder can be used. A preferred extruder is a pasta forming extruder which uses a single screw and a die which shapes the dough formed in the extruder. The extruder is operated at a pressure of from about 500 psig (3.45×106 Pa) to about 1500 psig (10.34×106 Pa) and a temperature of from about 70° F. (21.1° C.) to about 150° F. (65.6° C.) at a rotational speed of from about 15 rpm to about 80 rpm.

The snack pieces can be formed into a variety of shapes by adjusting the shape of the extruder orifice. The orifice has an opening dimension of from about 0.02 to about 0.05 inches (0.05 cm to about 0.13 cm). Various shapes can be used. These include, but are not limited to, animals, birds, stars, faces, bow ties, circles, concentric shapes and circles, and jack-o-lantern designs. The shapes are formed by interconnecting, shaped adjacent dough planes. The sides of the snack piece are formed by cutting the extruded dough as it emerges from the extruder into a length of at least about 0.12 inches (0.3 cm).

The dough can be prepared by any suitable method for combining together the previously described ingredients and adding them to the extruder. Preferred devices for mixing together these dough ingredients are conventional mixers. Hobart ® mixers are used for batch operations and Turbolize® mixers or mixers that are typically integral components of pasta extruders can be used for continuous mixing operations. The dry ingredients are preferably prescreened through a sieve with a smaller dimension than the die orifice to prevent blockage in the die of the extruder. The dough ingredients can be premixed to improve the uniformity of dough hydration.

The extruded shape emerges from the extruder through the die orifice and is cut into snack pieces at least about 0.12 inches (0.3 cm) in length, and preferably from about 0.12 inches (0.3 cm) to about 0.5 inches (1.27 cm) in length.

D. Frying

Preferably, the finished snacks are prepared by frying. The shaped pieces are passed through the frying medium until they are fried to a crisp state with a final moisture content of less than about 3%, preferably about 0.5% to 2.5%, water.

Continuous frying or batch frying of the snack pieces is also acceptable. In the continuous frying method, the pieces are immersed in the oil beneath a moving belt.

If desired, the snack pieces can be fried and then heated with hot air, superheated steam, or inert gas to lower the moisture to about 3% or less. This is a combined frying/baking step.

Typical frying media include fats and oils derived from animal and vegetable sources. Any hydrogenated or unhydrogenated fat can be used. These include corn oil, soybean oil, palm oil, cottonseed oil, canola oil, rapeseed oil, sunflower seed oil, lard, tallow, and peanut oil, among others. Synthetic triglycerides can also be used, including low calorie or zero calorie fats, e.g. polyol polyesters of fatty acids such as sucrose polyesters, etc. The snack pieces are fried at temperatures between about 300° F. (149° C.) and about 450° F. (232° C.). The exact fry time is controlled by the temperature of the oil and the starting water content. The fry time and temperature are easily determined by one skilled in the art.

The snacks made from this process typically have from about 20% to about 40% fat. Preferably, the fried snacks have from about 23% to about 35% fat.

EXAMPLES

The following Examples are illustrative of the present invention, but are not meant to be limiting thereof:

Example 1

| Ingredient | Dough Percentage |
| --- | --- |
| Yellow Masa | 44.54% |
| Instant Cleargel ™ | 11.74% |
| Baka Plus ™ | 3.26% |
| Maltrin ™ M100 | 2.61% |
| Sucrose | 1.30% |
| Flour Salt | 0.92% |
| Onion Powder | 0.48% |
| Baking Soda | 0.36% |
| DATEM | 0.80% |
| Added Water | 34.00% |

The dry ingredients are mixed and prescreened through a #25 sieve (particle size less than 0.0278 inches (0.707 mm)). These are added to a high pressure pasta extruder (available from Pavan of Galliera Veneta, Italy) at a rate of 4,000 lbs/hour (1,814 kg/hr). The emulsifier is fed into the extruder as a separate stream at 5.89 lbs/hour (2.67 kg/hr). Water is added as a third stream at 245.3 lbs./hour (111.3 kg/hr).

The pressure is 600 psig ($4.14 \times 10^6$ Pa) and the temperature is about 90° F. (32.2° C.) in the extruder.

The product exits through a die shaped like a face and is cut into pieces about 0.39 inches (1 cm) in length.

This product is fried in cottonseed oil at a temperature of 350° F. (176.7° C.) for 45 seconds. The product is then seasoned with salt.

Example 2

| Ingredient | Dough Percentage |
|---|---|
| Yellow Masa | 22.27% |
| White Masa | 22.27% |
| Instant Cleargel ™ | 11.74% |
| Baka Plus ™ | 3.26% |
| Maltrin ™ M100 | 2.61% |
| Sucrose | 1.30% |
| Flour Salt | 0.91% |
| Onion Powder | 0.48% |
| Baking Soda | 0.36% |
| DATEM | 0.56% |
| Polyglycerol Ester | 0.24% |
| Added Water | 34.00% |

The dry ingredients are mixed and prescreened through a #25 sieve (particle size less than 0.0278 inches (0.707 mm)). These are added to a high pressure pasta extruder (available from Pavan of Galliera Veneta, Italy) at a rate of 4,000 lbs/hour (1,814 kg/hr). The emulsifier is fed into the extruder as a separate stream at 5.89 lbs/hour (2.67 kg/hr). Water is added as a third stream at 245.3 lbs./hour (111.3 kg/hr).

The pressure is 600 psig ($4.14 \times 10^6$ Pa) and the temperature is about 90° F. (32.2° C.) in the extruder.

The product exits through a die shaped like a bird and is cut into pieces about 0.39 inches (1 cm) in length.

This product is fried in cottonseed oil at a temperature of 350° F. (176.7° C.) for 45 seconds. The product is then seasoned with salt.

What is claimed is:

1. A dough composition for making a fried snack, comprising:
   (1) from about 35% to about 60% starch based flour containing from about 6% to about 15% protein, wherein the ratio of gelatinized to ungelatinized starch in the starch based flour is from about 15 to 85 to about 65 to 35, and wherein the starch based flour comprises corn masa;
   (2) from about 2% to about 25% pregelled modified starch;
   (3) from about 0.1% to about 3% emulsifier;
   (4) from about 25% to about 55% added water; and
   (5) from about 0.2% to about 5% leavening.

2. The dough composition of claim 1, wherein said pregelled modified starch comprises modified waxy corn starch.

3. The dough composition of claim 2, wherein said dough additionally comprises from about 0.5% to about 15% hydrolyzed starch having a DE of from about 10 to about 36.

4. The dough composition of claim 3, wherein said hydrolyzed starch comprises maltodextrin.

5. A fried snack piece made from the dough composition of claim 1.

6. The fried snack piece of claim 5, wherein said fried snack piece has less than about 3% water and from about 20% to about 40% fat.

7. A process for making a fried snack, comprising:
   (a) extruding a dough composition comprising:
      (1) from about 35% to about 60% starch based flour containing from about 6% to about 15% protein, wherein the ratio of gelatinized to ungelatinized starch in the starch based flour is from about 15 to 85 to about 65 to 35, and wherein the starch based flour comprises corn masa;
      (2) from about 2% to about 25% pregelled modified starch;
      (3) from about 0.1% to about 3% emulsifier;
      (4) from about 25% to about 55% added water; and
      (5) from about 0.2% to about 5% leavening;
   said extrusion being at a pressure of from about 500 psig ($3.45 \times 10^6$ Pa) to about 1500 psig ($10.34 \times 10^6$ Pa) and a temperature of from about 70° F. (21.1° C.) to about 150° F. (65.6° C.);
   (b) extruding the dough through a shaped orifice of from about 0.02 to about 0.05 inches (0.05 to 0.13 cm) to form a snack piece;
   (c) cutting said snack piece to at least about 0.12 inches (0.3 cm) thick; and
   (d) frying said snack piece.

8. The process of claim 7, wherein said pregelled modified starch comprises modified waxy corn starch.

9. The process of claim 8, wherein said dough composition additionally comprises from about 0.5% to about 15% hydrolyzed starch having a DE of from about 10 to about 36.

10. The process of claim 9, wherein said hydrolyzed starch comprises maltodextrin.

11. A fried snack piece made according to the process of claim 7.

12. The fried snack piece of claim 11, wherein said fried snack piece has less than about 3% water and from about 20% to about 40% fat.

\* \* \* \* \*